United States Patent [19]

Gwynn

[11] 4,276,396
[45] Jun. 30, 1981

[54] HYDROCARBON RESIN AND PROCESS FOR ITS PREPARATION

[75] Inventor: Donald E. Gwynn, Overton, Tex.

[73] Assignee: Eastman Kodak Company, Rochester, N.Y.

[21] Appl. No.: 143,243

[22] Filed: Apr. 24, 1980

[51] Int. Cl.$^3$ ............................................... C08F 8/04
[52] U.S. Cl. ..................................... 525/338; 525/339
[58] Field of Search .................................. 525/339, 338

[56] References Cited

U.S. PATENT DOCUMENTS

| | | | |
|---|---|---|---|
| 2,911,395 | 11/1959 | Small | 525/339 |
| 2,963,467 | 12/1960 | Small | 525/339 |
| 3,040,009 | 6/1962 | Wadsworth et al. | 525/339 |
| 3,356,660 | 12/1967 | Moritz et al. | 525/339 |
| 3,362,939 | 1/1968 | Moritz et al. | 525/339 |
| 3,406,156 | 10/1968 | Aldridge et al. | 525/339 |
| 3,432,481 | 3/1969 | Webber | 525/339 |
| 3,442,877 | 5/1969 | Moritz et al. | 525/339 |
| 3,639,366 | 2/1972 | Broca et al. | 525/339 |

*Primary Examiner*—William F. Hamrock
*Attorney, Agent, or Firm*—Clyde L. Tootle; Daniel B. Reece, III

[57] ABSTRACT

This invention relates to novel hydrocarbon resins and processes for their preparation. More particularly, the invention relates to a high softening point hydrocarbon resin prepared by polymerizing with a Friedel-Crafts catalyst the $C_5$ and higher mixed thermally soaked hydrocarbon fraction mixture obtained in the steam cracking of propane and ethane. The polymerized resin is then quenched or diluted, washed to remove catalyst residues, dried and hydrogenated to provide high softening point hydrocarbon resins.

6 Claims, No Drawings

HYDROCARBON RESIN AND PROCESS FOR ITS PREPARATION

This invention relates to hydrocarbon resins and processes for their preparation. More particularly, the invention relates to high softening point hydrocarbon resins prepared by polymerizing the $C_5$ and higher unsaturated hydrocarbon stream obtained in the steam cracking of propane and the ethane which hydrocarbon stream is thermally treated prior to being polymerized with a Friedel-Crafts catalyst. The polymerized resin is then quenched, washed to remove catalyst residues, dried and hydrogenated to provide high softening point hydrocarbon resins.

It is well known in the art to prepare hydrocarbon resins by the aluminum chloride catalyzed polymerization of streams such as the $C_5+$ by-product streams from hydrocarbon cracking processes. In most of these prior processes the $C_5+$ stream is reacted directly with the catalyst. However, these processes do not always yield resins that are compatible in forming blends with a polyethylene. This incompatibility is attributed to the presence of cyclopentadiene monomer in the $C_5+$ stream which yields a gel-like, incompatible polymer when polymerized with aluminum chloride. For this reason, previously in some instances a thermal treatment or soaking of the $C_5+$ stream is carried out prior to polymerization which brings about the dimerization of the cyclopentadiene to its dimer, dicyclopentadiene. Such heat treating processes are disclosed in, for example, U.S. Pat. Nos. 3,817,953 and 3,709,854, which illustrate the use of the thermal treatment prior to the polymerization step. However, these heat-treating processes have not always proven satisfactory since the presence of approximately 10 percent dicyclopentadiene will provide a high degree of cross-linked polymer which will generally be incompatible with polyolefins, such as polyethylene. It would therefore be an advance in the state of the art to provide a high softening point hydrocarbon resin which is compatible with polyolefins such as polyethylene and which can be prepared from the $C_5$ and higher feed stream obtained from the steam cracking of propane and ethane.

In accordance with the present invention, a thermal treated fractioned hydrocarbon feed stock composed of $C_5$ and higher stream is polymerized with a Friedel-Crafts catalyst, quenched, washed to remove catalyst residues, dried and hydrogenated to provide a high softening point hydrocarbon resin which has good compatibility with low density polyethylenes.

The preparation of hydrocarbon resin feedstocks from cracked gas by-product streams is well known in the art. The propane and ethane feedstock is cracked to provide ethylene and propylene. The feedstock after cracking is subjected to fractionation to remove hydrogen, methane and $C_2$ to $C_4$ light ends. After fractionation, the residue of $C_5$ and higher feedstock is, according to my invention, thereafter subjected to a thermal soaking process. However, after the thermal soaking process, the stream is fractioned and the bulk of the stream, the olefins or dienes and aromatics up through toluene, are removed from the heat treated product to provide a concentrated base material which is the new resin feedstock for my invention. This new resin feedstock provides a resin which has high compatibility properties with low molecular weight polyethylene. In preparing these resins, it has been discovered that boron trifluoride is distinctly superior to aluminum chloride as the Friedel-Crafts polymerization catalyst. This is completely unexpected since it is known generally in the literature that aluminum chloride is the preferred catalyst for the polymerization of the cracked gas by-product streams even though other Friedel-Crafts type catalysts are described as operable.

The resin feedstock used in this invention is, therefore, unique in that after heat-treated, the mixture is fractionated to remove any remaining dienes such as isoprene, piperylenes, cyclopentadiene and methylcyclopentadienes. Furthermore, the distillation process using a base temperature of 170°-200° C. also serves to decrease the amount of dicyclopentadiene in the resin feedstock. The resins prepared from feedstock which has been heat-treated and subsequently fractionated using a base temperature of 170°-200° C. have been found to have high softening points and to be compatible with low molecular weight polyethylene wax.

One of the advantages of using boron trifluoride as the catalyst is the lack of contaminants in the crude resin. A high level of organic and inorganic chloride, aluminum and sodium contaminants are associated with the resin obtained from aluminum chloride catalyzed polymerization. However, only very small quantities of sodium, boron and fluoride remain in the resin obtained from the boron trifluoride polymerization. These differences apparently arise from the unique behavior of the boron trifluoride polymer solution to give a very clean layer separation in the caustic wash step. The aluminum chloride catalyzed polymer, on the other hand, gives a cloudy suspension in the caustic wash and apparently some emulsion problems. A comparison of the resins obtained with these two polymerization catalysts after the caustic wash separation shows that the boron trifluoride catalyzed resin contained between a third and a hundredth less sodium than the aluminum chloride catalyzed resin.

Since having a low level of contaminants in the crude resin product is very important to the lifetime of the hydrogenation catalyst, there is a real advantage in a process that is able to use the boron trifluoride catalyst. For example, the high level of chloride and metals from the aluminum chloride catalyzed polymerization was found to be in part deposited on the hydrogenation catalyst surface and to thereby rapidly bring about loss in catalytic activity.

The steps in the preparation of the resin feedstock for use in the present invention are as follows:

(1) The $C_5+$ by-product stream, boiling point 20°-200° C., and composed principally of pentances, isoprene, cyclopentene, cyclopentadiene and dimer, methylcyclopentadiene and dimers, methylcyclopentenes, benzene and toluene is heat-treated by continuously passing the stream through a stirred autoclave maintained at 175°-250° C., preferably at 225°, and under a pressure of 450-500 psig. The through-put time can be varied from about 5 and 16 hours, preferably about 2 to 4 hours.

(2) The heat-treated mixture is then fractionally distilled to remove the unreacted $C_5$'s and the benzene-toluene mixture. The fractionation of the heat-treated stream can be carried out using one or more fractionation columns so long as a base temperature of 170°-200° C. is employed to ensure that substantially all of the dicyclopentadienes are removed. In the present invention it is desirable to employ two columns so that the unreacted $C_5$'s and the benzene-toluene mixtures are recovered as separate fractions since these fractions can be further used for different purposes. However, these two fractions can be recovered together as one mixture and the residual base product is the resin feedstock used in the process of this invention.

In the analysis of the resin feedstock by gas chromastography it is found that about 40–50 percent of the above fractions are not eluted from a 50 foot Squalane SCOT fractionation column when a maximum temperature of 130° is employed. The major components of the feedstock are the $C_{10}$ adducts with tetrahydromethanoindan being present in about 20–30 percent. Dicyclopentadiene is present at about 0.5–8.0 percent depending on whether the base temperature used is 170° or 200° C. in the fractionations. Overall the resin feedstock is a very complex mixture comprised of several hundred components.

The resin feedstock may be polymerized in a conventional manner with conventional Friedel-Crafts catalyst. However, as noted hereinbefore, boron trifluoride, preferably employed as boron trifluoride dietherate, was found to be the preferred catalyst as compared to the more widely used hydrocarbon resin catalyst, aluminum trichloride. However, any conventional Friedel-Crafts catalyst can be used. The polymerizations can be run either batch wise or continuous.

In batch runs the catalyst, either aluminum trichloride or boron trifluoride etherate is added to the stirred resin feedstock at ambient temperature and under an inert atmosphere. The usual catalyst concentrations were in the range 0.4–2.0 weight percent. When boron trifluoride etherate is used the amount of catalyst employed is figured as boron trifluoride. The resin feedstock is slowly heated to the polymerization temperature of about 60° to 150° C. and maintained at that temperature the prescribed length of time. The preferred conditions using aluminum chloride as the catalyst were 1.5 percent catalyst for a reaction temperature of 140° for a period of about 2 to 4 hours. The preferred conditions with boron trifluoride are 0.6 percent catalyst at a temperature of 160° for a period of 2 to 4 hours.

In the continuous runs a catalyst slurry or solution and the resin feedstock were added to a stirred reactor maintained at the polymerization temperature. The overflow from the first reactor passed into a second reactor. With aluminum chloride catalyst the preferred concentration was 1.0 percent by weight with the temperatures of the first reactor at 70° C. and the second reactor at 140° C. The most suitable addition rate gave an approximate residence time of 12 hours in both reactors.

The crude resin reaction mixture was then quenched or diluted with a hydrocarbon solvent such as mineral spirits, extracted with an aqueous caustic solution to destroy the catalyst, dried by azeotropic distillation and hydrogenated under conventional conditions to produce a low color, high softening point resin.

The hydrogenation can be carried out using a nickel-supported catalyst, such as Harshaw Ni-3210T, at a temperature of 300°–320° C. and 3000 psig hydrogen for a period of 1-2 hours for a batch operation. From the continuous polymerization unit the crude resin solution was passed continuously through two catalyst beds; the first contained 0.5 percent palladium on alumina catalyst maintained at a temperature of about 260° and 250–500 psig hydrogen, and the second reactor used a supported nickel catalyst, such as Harshaw's Ni-3210T, at a temperature of about 290°–330° C. and 2900 psig hydrogen. the hydrogenation time was generally 1-2 hours in each reactor to provide a low color resin having a Gardner color of about 5 or less.

The hydrogenated resin solution is then filtered to remove catalyst fines and concentrated by means of vacuum stripping or gas stripping to produce a low color resin with the desired high softening point of about 100° to about 145° C., preferably about 115° to about 130° C.

The compatibility of the hydrogenated product with low molecular weight polyethylene wax is measured as the light transmittance of a 30 percent blend with low molecular weight polyethylene wax measured at 525 nm and 150° C. The lower limit for a compatible resin is a 75 percent light transmittance.

This invention can be further illustrated by the following examples, although it will be understood that these examples are included merely for purposes of illustration and are not intended to limit the scope of the invention unless otherwise specifically indicated.

EXAMPLE 1

This example illustrates the preparation of a resin feedstock useful in preparing a low color hydrocarbon resin.

100 Grams of a $C_5+$ by-product stream produced in the cracking process of an ethane-propane mixture and composed principally of pentenes, isoprene, cyclopentene, piperylenes, cyclopentadiene, methylcyclopentenes, methylcyclopentadienes, benzene and toluene was stabilized with 20 ppm 2,6 di-tert-butyl-p-cresol (BHT) and passed through a stirred autoclave heated at 225° C., with a residence time of 4.85 hours. The pressure in the autoclave was operated at 450±10 psig. The heat-treated stream was fractionated to first remove the unreacted $C_5$'s with an overhead temperature range of 60°–65° and then to remove the benzene-toluene mixture at 80°–85° C. The base temperature was maintained at 170° C. Chromatographic analysis of the remaining base product, hereafter referred to as the resin feedstock, showed a variety of $C_{10}$ adducts including about 8 percent dicyclopentadiene. The prominent $C_{10}$ product was tetrahydromethanoindan in about 26 percent. The resin feedstock contained lesser amounts of $C_{11}$–$C_{15}$ adducts in addition to a significant amount of thermal polymer ($>C_{20}$) that did not elute from the column. Conversion of this $C_5\pm$ by-product stream to the resin feedstock was 19.7 grams.

EXAMPLE 2

These next two examples illustrate the batch preparation of a hydrocarbon resin based on the resin feedstock described in Example 1 using aluminum chloride as the catalyst.

To 100 grams of resin feedstock was added 1.5 percent by weight of aluminum chloride under an inert atmosphere at ambient temperature. The mixture was slowly heated until at about 115° a slight exothermic reaction set in which took the temperature to 140°. The temperature was maintained at 140° with external heating for 4 hours. The reaction product was diluted with 100 mls mineral spirits and washed twice while hot with about 20 ml of a 10 percent caustic solution. The organic phase was then dried by azeotropic distillation and filtered. The filtrate was subjected to hydrogenation in a mineral spirits solution over a nickel catalyst at 320° and 3,000-psig hydrogen for 1 hour. The product was filtered and the solvent and low molecular weight polymer removed at 1 mm and a base temperature of 300°. The resin was obtained in 22 percent yield, 22 grams, with a Gardner color of 2, a softening point of 119° C. and a percent light transmittance as a 30:70 blend of hydrogenated resin with low molecular weight polyethylene of 72 percent.

EXAMPLE 3

The process of Example 2 is repeated except that 1.0 percent by weight of aluminum chloride is used in place of 1.5 percent. The resin was obtained in 15 percent yield with a Gardner color of 2, a softening point of 105° C., and a percent light transmittance as a 30/70 blend with low molecular weight polyethylenes of 83 percent.

EXAMPLE 4

To 100 grams of the resin feedstock of Example 1 was added 1.2 percent by weight boron trifluoride dietherate, in a process as described in Example 2 substituting boron trifluoride etherate for aluminum chloride. The reaction showed a slight exotherm and the temperature rose to 55° before external heat was applied. The temperature was maintained at 130°–135° for 4 hours, cooled and diluted with 100 ml mineral spirits. The catalyst was removed by a washing with 20 ml of a 10% caustic wash and the resin product was worked up as described in the previous examples. The resin was obtained in 54 percent yield, 54 grams, having a Gardner color of 4, a softening point of 134° C. and a light transmittance as a 30:70 blend with low molecular weight polyethylene of 83 percent.

EXAMPLE 5

The process of Example 4 is repeated except that only 0.6 percent by weight of boron trifluoride etherate is used in place of 1.2 percent. The resin was obtained in 50 percent yield with a Gardner color of 3, a softening point of 142° C., and a percent light transmittance as a 30/70 blend with low molecular weight polyethylene of 75 percent.

EXAMPLE 6

This example illustrates the preparation of a blend of the present invention and low density polyethylene wax and its evaluation in a hot melt adhesive formulation.

A mixture by weight of 70 percent polyethylene wax, 29.55 percent hydrocarbon resin, 0.1 percent tetrakis[methylene-3′,5-di-t-butyl-4-hydroxyphenyl)propionate]methane (Irganox 1010), and 0.35 percent lauryl stearyl thiodipropionate (Cyanox 1212) was heated in a nitrogen atmosphere to 177° C. until molten. The melt was then mechanically stirred for 30 minutes until homogeneous and tested as a hot melt adhesive. The results are summarized below.

Color—1 (Gardner)
Softening Pt., °C.—100
73° F. Peel Strength, gm—776
Shear Failure Temperature, °F.—193
Peel Failure Temperature, °F.—106
Viscosity (350° F.), cp—2,225

The hydrocarbon tackifying resins prepared according to the present invention are useful in blends with low molecular weight polyethylene wax to produce hot melt adhesives. These hydrocarbon resins can be used as substitutes for terpene or rosin-based resins or for any of the hydrogenated, aliphatic resins that are commercially available. Other uses for these resins include rubber compounding, highway markings, inks, textile sizing, or in many other applications where terpene, rosin or hydrocarbon resins are normally used.

The invention has been described in detail with particular reference to preferred embodiments thereof, but it will be understood that variations and modifications can be made within the spirit and scope of the invention.

I claim:

1. A high softening point hydrocarbon resin prepared by a process which comprises heat treating the $C_5$ and higher hydrocarbon fraction mixture obtained in the steam cracking of propane and ethane, fractionating said heat treated hydrocarbon fraction to remove the olefins and aromatics up through toluene, polymerizing said fractionated heat treated fraction with a Friedel-Crafts catalyst, diluting said polymerized hydrocarbon fraction, washing said diluted polymerized hydrocarbon fraction with aqueous caustic, drying said washed fraction, and hydrogenating said dried fraction to provide a low color hydrocarbon resin having a softening point of about 115° to about 130° C. and a Gardner color of not more than 5.

2. A process for preparing a high softening point hydrocarbon resin which comprises heat treating the $C_5$ and higher hydrocarbon fraction mixture obtained in the steam cracking of propane and ethane, fractionating said heat treated hydrocarbon fraction to remove the olefins and aromatics up through toluene, polymerizing said fractionated heat treated fraction with a Friedel-Crafts catalyst, diluting said polymerized hydrocarbon fraction, washing said diluted polymerized hydrocarbon fraction with aqueous caustic, drying said washed fraction, and hydrogenating said dried fraction to provide a low color hydrocarbon resin.

3. A process according to claim 2 wherein said heat treating of the $C_5$ and higher hydrocarbon fraction mixture is carried out at a temperature of from 175° to about 250° C. for a period of about 0.5 to 16 hours and at a pressure of about 450–500 psig.

4. A process according to claim 3 wherein said polymerization is carried out at a temperature of about 60° to 150° C. for a period of about 2 to about 15 hours using the Friedel-Crafts catalyst in an amount of about 0.4 to about 2 weight percent.

5. A process according to claim 4 wherein said Friedel-Crafts catalyst is aluminum chloride.

6. A process according to claim 4 wherein said Friedel-Crafts catalyst is boron trifluoride dietherate.

* * * * *